United States Patent [19]

Sachse et al.

[11] Patent Number: 5,288,435
[45] Date of Patent: Feb. 22, 1994

[54] TREATMENT OF RADIOACTIVE WASTES

[75] Inventors: John D. Sachse, Pittsburgh; Larry R. Eisenstatt; Walter P. Drosjack, both of Penn Township, Westmoreland County; David H. Weigle, Normalville; C. Patrick Keegan, South Huntingdon Township, Westmoreland County, all of Pa.

[73] Assignee: Westinghouse Electric Corp., Pittsburgh, Pa.

[21] Appl. No.: 877,299

[22] Filed: May 1, 1992

[51] Int. Cl.$^5$ ............................................. G21C 21/00
[52] U.S. Cl. ................................... 264/0.5; 252/629; 252/626; 976/DIG. 385; 976/DIG. 391
[58] Field of Search .................... 252/629, 626, 632; 264/0.5; 976/DIG. 385, DIG. 384, DIG. 391, DIG. 393, DIG. 385

[56] References Cited

U.S. PATENT DOCUMENTS

| | | | |
|---|---|---|---|
| 3,321,409 | 5/1967 | Grover et al. | 252/301.1 |
| 4,020,004 | 4/1977 | Schulz et al. | 252/301.1 W |
| 4,139,360 | 2/1979 | Piper | 65/134 |
| 4,297,304 | 10/1981 | Scheffler et al. | 264/0.5 |
| 4,299,611 | 11/1981 | Penberthy | 65/27 |
| 4,376,070 | 3/1983 | Pope et al. | 252/629 |
| 4,424,149 | 1/1984 | Bege et al. | 252/629 |
| 4,632,690 | 12/1986 | Colwell, Jr. et al. | 65/134 |
| 4,666,490 | 5/1987 | Drake | 65/27 |
| 4,759,879 | 7/1988 | Cadoff et al. | 252/629 |
| 4,782,497 | 11/1988 | Sasaki et al. | 373/29 |
| 4,895,678 | 1/1990 | Ohtsuka et al. | 252/632 |
| 4,903,277 | 2/1990 | Igarashi | 373/30 |
| 5,022,329 | 6/1991 | Rackley et al. | 110/234 |
| 5,106,601 | 4/1992 | Chang et al. | 423/235 |

OTHER PUBLICATIONS

Vitrification Process Equipment Design For The West Valley Demonstration Project, DOE/NE/44139-42.
Design And Operating Features Of The High-Level Waste Vitrification System For The West Valley Demonstration Project, PNL-5780 (Mar. 1986).
Glass Furnace Project Final Report, MLM-3229 (Feb. 1985).
A Vitrification Process For The Volume Reduction And Stabilization Of Organic Resins, GEND-023 (Oct. 1982).
Norman F. Sather, "New Methods of Detoxification and Site Restoration are being Developed, Tested, and Demonstrated by the National Labs and Private Industry," *Mechanical Engineering*, Sep. 1988, pp. 70-75.
C. C. Chapman, "Design Preferences For A Slurry-Fed Ceramic Melter Suitable For Vitrifying West Valley Wastes," West Valley Nuclear Services Co., Inc.

*Primary Examiner*—J. Woodrow Eldred
*Attorney, Agent, or Firm*—Daniel P. Cillo

[57] ABSTRACT

Method and apparatus for the incineration and vitrification of radioactive waste materials. Waste materials are fed into a melter containing molten glass wherein the waste is incinerated and vitrified into the glass matrix. Gases produced are combusted in an extended plenum area preferably designed to provide a residence time of at least 3 seconds. A portion of the sulfur compounds in the combustion gases are incorporated into a solid matrix of gypsum by contacting the sulfur compounds with an aqueous solution and calcium hydroxide.

9 Claims, 2 Drawing Sheets

TREATMENT OF RADIOACTIVE WASTES

FIELD OF THE INVENTION

The present invention relates to processes and process systems for incinerating and vitrifying radioactive waste materials. Specifically, the invention relates to the incorporation of radionuclides as ash into a glass matrix and in the case of waste materials containing sulfur compounds, the additional incorporation of the sulfur into a gypsum-based matrix.

BACKGROUND OF THE INVENTION

The effective disposal of hazardous radioactive waste materials is a continuing problem for industry. These waste materials can take a variety of forms including organic materials, which are combustible, and inorganic materials such as metal oxides, which are not combustible. Typically these wastes include ion exchange resins used in the nuclear industry and various articles of use such as clothing, paper and wood containers, rags, etc. The ion exchange resins are typically porous beads of polystyrene, cross-linked with divinyl benzene. These resins remove such compounds as borate, chloride, carbonate, and cesium ions and other fission and corrosion products from liquid streams.

Early systems employed the use of incinerators to burn waste materials. These incinerators had problems associated with ashes, produced by incomplete combustion, entrained in the off-gas. These airborne ashes thus presented an environmental hazard if not properly treated by filtering systems. Also, problems existed with high amounts of noncombustible leachable inorganics left behind in the bottom ash.

Various vitrification and incineration processes were employed to resolve the problems of the incineration processes. Such systems are set forth in U.S. Pat. Nos. 5,022,329; 4,666,490; 4,376,070; 4,424,149; 4,297,304; 4,299,611; 4,139,360; 4,020,004; 3,321,409 and in an article titled "Hazardous Waste: Where to Put It? Where Will It Go?", Mechanical Engineering, Sept. 1988, pgs. 70–75. These systems describe the vitrification of the ash product into a glass material to limit the leaching of the radionuclides from the ash using melters and cyclone furnaces. The cyclone furnace design in U.S. Pat. No. 5,022,329 requires the burning of fuels in order to combust the waste material instead of initiating combustion by contacting the waste material with a molten glass pool. The glass pool design is preferred in that the glass is heated by electrodes thereby reducing the dangers associated with the fuel heating of the cyclone furnace. The glass pool designs are deficient in that they do not ensure complete combustion in the plenum area above the glass pool, thus releasing combustible gases in the off-gas stream from the melter.

The neutralization and solidification of combustible sulfur compounds which are present in various waste materials is not disclosed in any of these systems. The sulfur compounds that are present in the combustion off-gases pose an environmental problem and should preferably be removed prior to gaseous emission to the atmosphere. The sulfur compounds are a major concern when treating ion exchange waste materials. Other methods of treating ion exchange waste materials is by resin dewatering and resin drying; however, these processes do not attain high levels of volume reduction and the final waste form is not solidified.

A need therefore exists to design a safe, efficient system for incinerating and vitrifrying radioactive waste materials. The system should also be designed to provide for proper disposal of sulfur compounds found within the waste material.

SUMMARY OF THE INVENTION

The present invention relates to processes and process systems for incinerating and vitrifying hazardous radioactive waste material within a melter having an extended heated plenum area designed to ensure combustion residence times of at least 3 seconds at temperatures of at least about 980° C. (1800° F.). The invention is preferably suited for handling radioactive wastes that contain sulfur compounds such as spent ion exchange resins. The process encases radionuclides found within the radioactive waste material into a glass substance and also into a gypsum by-product. Any remaining radionuclides are filtered out of the process off-gases using high efficiency particulate filters to a level acceptable for atmospheric emission.

The basic process of the invention is carried out by feeding the waste material along with glass forming material into a melter. It is preferred to feed these materials as an aqueous slurry to decrease the amount of feed material entrained in the gases above the glass pool. The melter has a molten glass pool in its lower portion and an extended plenum area above the glass pool. The waste material enters the melter and contacts the molten glass forming a solid ash and waste gas. The solid ash is retained and incorporated into the glass pool. The waste gas is subjected to substantially complete combustion in the plenum area by contacting the waste gas with oxygen, preferably air, at elevated temperatures of at least about 980° C. (1800° F.). The residence time for the waste gas in the plenum area preferably is at least about 3 seconds, most preferably at least about 5 seconds. The long residence time is advantageous in that the danger of having hazardous uncombusted compounds leaving the process is deceased due to the achievement of a higher level of combustion.

When a feed containing sulfur compounds is used, the combustion of the waste gas forms an off-gas that contains sulfur compounds, preferably sulfur dioxide. This off-gas is then contacted with an aqueous solution, preferably in a scrubber, to form sulfuric acid. The sulfuric acid is then contacted with calcium hydroxide to form gypsum and water. The gypsum thus contains a portion of the sulfur compounds originally found in the feed, and a portion of the radionuclides found within a radioactive feed containing sulfur.

Various preferred embodiments of the inventive process are provided herein. The process can include the passing of the scrubber off-gas over a surface to allow water particles to collect, preferably in a mist eliminator. This process step helps remove suspended water particles from the scrubber off-gas in preparation for further filtering operations. The aqueous fluid from this step is preferably returned to the process at the scrubber.

A further purification of the gaseous stream is accomplished by passing the mist eliminator off-gas through a filter system designed to remove at least about 98% by weight, and preferably at least about 99%, of all particles above about 0.6 microns.

The water formed from the gypsum reaction can be advantageously recycled to be added to the feed materials. This embodiment creates a substantially closed loop system for the process water thereby limiting radioactive waste water disposal.

DETAILED DESCRIPTION OF THE INVENTION

The present invention relates to processes and process systems for incinerating, vitrifying, and encasing hazardous radioactive waste material. An improved melter design provides for higher levels of incineration thus reducing hazards associated with non-combusted off-gases. A preferred embodiment of the present invention incorporates special processing equipment for handling radioactive waste materials that contain sulfur compounds.

Figure 1:
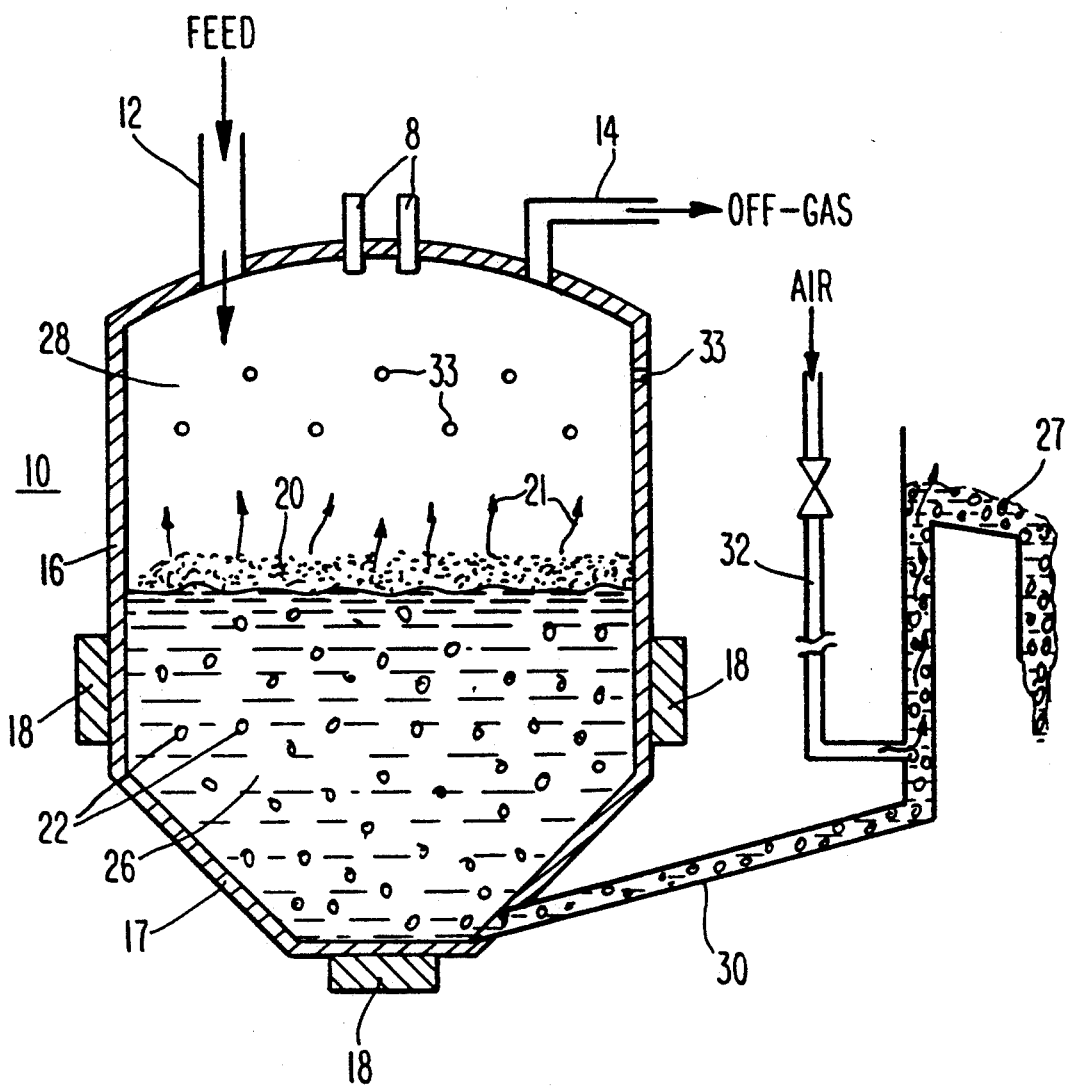
FIG. 1 is a cross-sectional view of an embodiment of the present invention illustrating a melter design.

The melter 10, as shown in FIG. 1, is a containment chamber capable of holding a pool of molten glass 26. The melter 10 is preferably designed in the shape of an inverted pyramid having sloping lower walls 17 and substantially perpendicular side walls 16. The sloping lower walls 17 define a reservoir for containing the molten glass. This shape is advantageous in that (i) it provides a sump region for collection of conductive sludges, (ii) it reduces the operating inventory of molten glass, and (iii) it provides greater structural support.

The molten glass 26, introduced via the feed line 12 as a glass forming substance, along with the waste material, is heated by supplying alternating electrical current between the electrodes 18. This causes an electrical current to flow through the glass. This type of glass formation and heating is referred to as the "Joule effect." The melter 10 preferably has three electrodes 18 arranged with two electrodes on the side of the melter and one electrode on the bottom of the melter. The current is phased between the electrodes 18, thus creating a potential between electrodes. The three electrode design therefore allows for the generation of thermal currents within the molten glass thus producing a more homogeneous glass product. As an alternative to the use of alternating electrical current, direct current may be used to heat the molten glass 26.

The melter 10 is provided with an extended plenum area 28 defined as the gaseous region above the surface of the molten glass 26. This plenum area provides a space where incineration of the combustible waste may occur. Combustion inlets 33 allow for the regulated introduction of air into the plenum area 28. The combustion process will be described herein by reference to air as the combustion gas, however it is known that oxygen is the combustion reactant. Plenum heaters 8 are provided to heat the waste gases 21 produced during the vitrification of the ash 20. The plenum heaters 8 are designed to maintain the temperature in the plenum area 28 above at least about 980° C. (1800° F.). The plenum heaters 8 are preferably electrical radiant heaters. The plenum area 28 is preferably designed to accommodate a residence time for the waste gases 21 of at least about 3 seconds, most preferably at least about 5 seconds, in the combustion atmosphere to form combusted off-gases which leave the melter 10 via off-gas line 14. The achievement of a desired residence time is dependent upon such variables as the feed rate and composition, the temperature and pressure of the plenum area, and the volume of the plenum area 28. The exact dimensioning of the plenum area 28 will vary therefore depending upon these operational variables. The calculation of the residence times are well within the skill of those in the art.

The melter 10 is provided with a glass line 30 used to transport the molten glass 26 containing the vitrified ash 22 to storage. An air lift is used to aid in the removal of the glass product 27 by incorporating air into the ash containing glass via air lift line 32 which is controlled by air valve 31. This method of glass product removal is preferred over gravity flow techniques that incorporate valves on the glass line 30. There are two reasons for this preference: first, the flow control valve is not exposed to the punishing molten glass environment; second, the control valve is easier to repair.

The present invention is preferably designed to handle hazardous radioactive waste materials. Most preferably, the process system is designed to handle wastes that contain sulfur compounds. Sulfur containing waste materials include, for example, spent ion exchange resins, particularly strong acid cation exchange resins, used in the nuclear processing industry. The nuclear processing industry employs these ion exchange resins to remove fission and corrosion products such as cesium, chloride, and borate compounds. These ion exchange materials generally are porous beads of polystyrene crosslinked with divinyl benzene.

Figure 2:
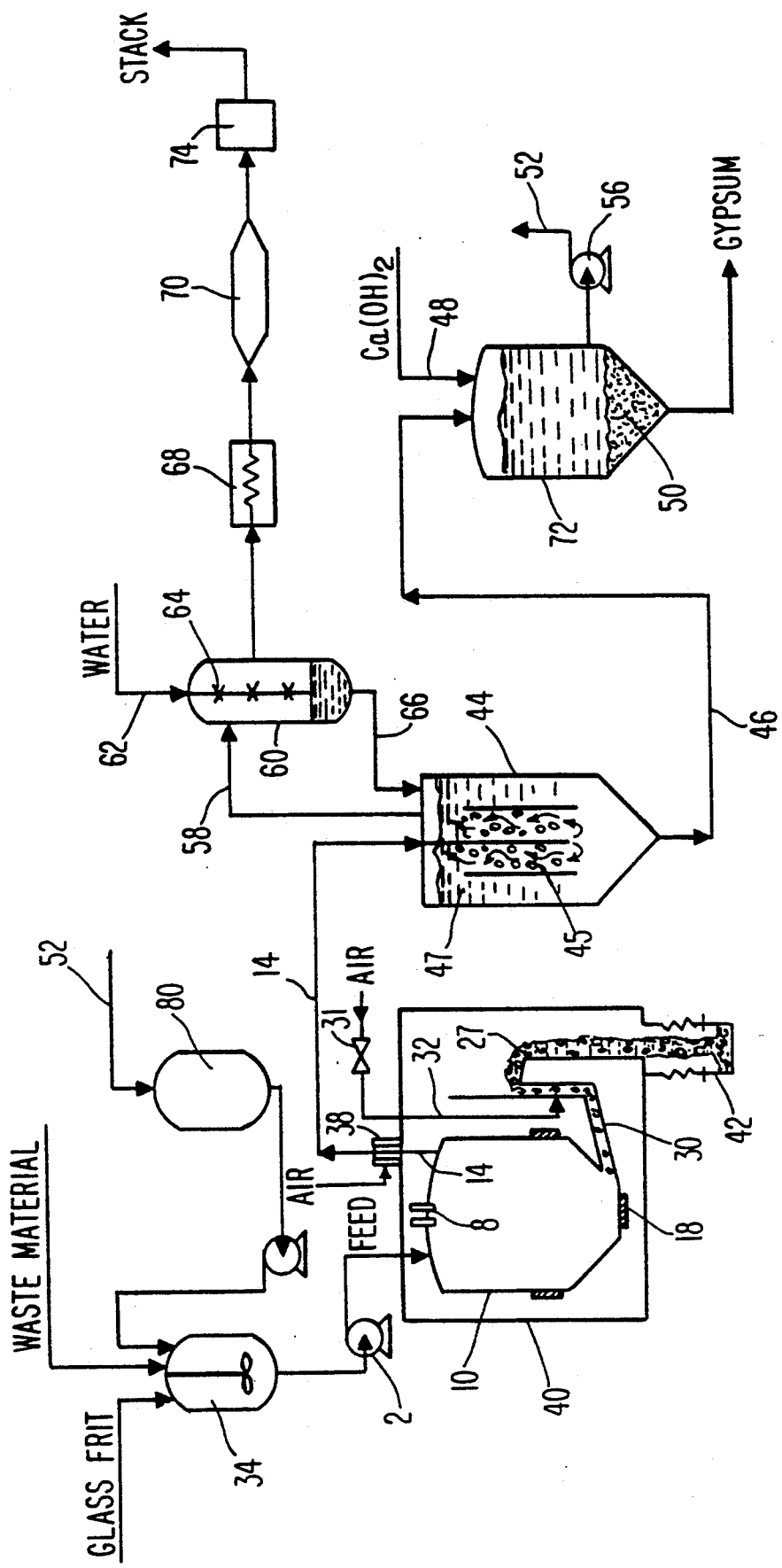
FIG. 2 is a cross-sectional process flow diagram of an embodiment of the present invention illustrating a process design layout.

Referring to FIG. 2, a process system is depicted for the incineration and vitrification of waste materials along with the incorporation of radioactive sulfur in a gypsum matrix. The waste material is preferably fed as a slurry to the melter 10. A feed tank 34 is provided in which the waste material, glass forming material, and water are mixed to prepare a feed slurry. The glass forming material typically has $SiO_2$ as its major component and can also include $Al_2O_3$, MgO, FeO, CaO, $Na_2O$, and other metal oxides. Preferably the glass forming material is glass frit which is a common product of glass forming operations. Water is used as part of the feed slurry for several reasons, including (i) better contact between waste material and molten glass; (ii) light-weight resin particles are weighed down thus reducing entrainment in the off-gases; and (iii) improved feed delivery processing. The weight ratios of the feed waste material:glass:water can vary over a wide range depending upon the desired composition of the final product. Typically the feed weight proportions are from about 30 to 70 percent waste material, about 5 to 25 percent glass frit, and about 20 to 60 percent water.

The feed slurry is transferred via pump 2 into the melter 10. The melter 10 has a pool of molten glass 26 that is prepared by introducing a glass forming substance, preferably glass frit, into the melter and heating the glass frit until it is molten. Preferably, the glass is heated using the plenum heaters 8 and the electrodes 18 to an operation temperature of from about 980° C. (1800° F.) to about 1310° C. (2400° F.). The melter 10 is encased in a melter chamber 40 to provide adequate protective insulation.

The slurry feed, upon contact with the molten glass 26 and air, combusts and forms an ash 20. The solid ash particles become vitrified ash 22 upon incorporation into the molten glass 26. Combustion of the feed produces a waste gas 21 that may contain combustible compounds. The waste gas 21 mixes with air fed into the plenum area 28 via the combustion inlets 33 and is then incinerated. It is preferred to provide an excess amount of air to achieve a high level of combustion. The plenum area 28 is designed to operate above at least 980° C. (1800° F.), and this temperature is maintained by the plenum heaters 8. The plenum area 28 is preferably extended high enough from the molten glass surface to ensure that the waste gas 21 has an average residence time of at least about 3 seconds, most preferably at least about 5 seconds. The combusted waste gas product, the off-gas, exits the melter 10 via the off-gas line 14. The off-gas will contain sulfur compounds, preferably sulfur dioxide compounds if the waste material contained sulfur compounds that volatilized within the melter 10.

The molten glass 26 containing the vitrified ash 22 exits the melter 10 via the glass line 30. Air is supplied into the glass line 30 via the air lift line 32 regulated by air valve 31. This glass product 27 then flows into an appropriate storage container 42.

The off-gases from the melter 10 frequently contain suspended particulates and pollutants. When the feed is radioactive, a fraction of the radionuclides originally found in the feed slurry are either entrained or volatilized into the off-gas. The off-gas must therefore be further processed to remove these contaminants to below acceptable release standards. The off-gas is initially treated by a cooler 38 to reduce its temperature, preferably to below about 650° C. (1200° F.). The cooler 38 is preferably a film cooler that injects a boundary layer of cooler air into the off-gas stream. The cooler 38 functions to aid in the prevention of particulate blockage in the exiting off-gas stream. This is accomplished by cooling the melter off-gas to decrease its tackiness caused by the presence of certain particulates.

The off-gas from the melter is then contacted with an aqueous solution. Preferably the off-gas is transported through off-gas line 14 into the scrubber 44. The scrubber 44 is preferably a submerged bed scrubber. The scrubber 44 contains a bed of particles 45 which act to break-up the off-gases and thereby increase the gas-liquid interface. The off-gases are cooled within the scrubber 44, which is preferably operated below about 100° C. (212° F.) to avoid excess gas production. The off-gases percolate up through the particles 45 and a portion thereof form a scrubber off-gas. A scrubber solution 47 is maintained within the scrubber 44. The scrubber solution 47 is an aqueous solution that contains condensed off-gas compounds and particulates. The scrubber 44 preferably retains a high fraction of all particles above about 1 micron in the off-gas. In the preferred embodiment where sulfur compounds are present in the off-gas, the sulfur compounds are then contacted with the scrubber solution 47 to form a sulfuric acid solution.

The off-gases that are not condensed within the scrubber 44 are transferred as scrubber gas to the mist eliminator 60 via line 58. Such mist eliminators are well known in the art for filtering gaseous streams containing entrained fluids. The mist eliminator 60 operates like a filter to provide a surface area for water particles, entrained in the scrubber off-gas, to collect and also to collect certain radionuclide particles, especially cesium particles. Water is periodically fed via line 62, into the mist eliminator 60 by means of nozzles 64 to cleanse the surfaces within the mist eliminator 60. The water collected within the mist eliminator 60 is preferably recycled into the scrubber 44 via line 66.

The gases exiting the mist eliminator 60 may then be further processed by passing them through a filter 70. Preferably, the temperature of the stream exiting the mist eliminator 60 is increased in heater 68 to avoid condensation in the filter 70. The filter 70 is preferably a high efficiency dry particulate filter designed to remove at least about 98% wt., most preferably about 99.8% wt., of particles below about 0.6 micron. The filter 70 thereby removes cesium or other radionuclides that have passed through the mist eliminator 60. The gases exiting the filter 70 can be further processed by exhausting to the atmosphere through a stack using conventional techniques.

In a preferred embodiment, the process is operated under a slight sub-atmospheric pressure by the incorporation of a blower 74 that draws the off-gases through the system. The blower is located downstream from the filter 70. The inclusion of the blower 74 provides for two advantages: (1) the negative pressure will assure that the radionuclides are contained within the process equipment, and (2) the negative pressure within the melter 10 will allow combustion air to be drawn into the plenum area 28 without the need for the inclusion of a combustion air blower.

The present process and system equipment provide for the volume reduction of the sulfur contaminants by further incorporating the sulfur compounds contained within the sulfuric acid solution generated in the scrubber 44 into a solid matrix. This sulfuric acid solution can contain radionuclides. The sulfuric acid contained in the scrubber solution 47 is transferred via line 46 to the gypsum tank 72. Calcium hydroxide, $Ca(OH)_2$, is fed into the gypsum tank 72 via line 48. The calcium hydroxide contacts the sulfuric acid solution and forms solid gypsum 50, $CaSO_4$, and water as a reaction by-product. The gypsum 50 settles to the floor of the tank and can then be removed using conventional solid transfer techniques. The aqueous solution remaining in the gypsum tank 72 is removed to maintain a proper tank liquid level. Preferably, the solution is transported via a pump 56 through line 52 into a recycle water tank 80. The water from the recycle water tank 80 can then be used to slurry the glass frit and waste material feed in feed tank 34. The gypsum tank 72 is preferably operated below about 100° C. (212° F.) to avoid excess gas production. In such a way, radioactive sulfur compounds are economically incorporated into a neutralized solid matrix thus decreasing the volume of the waste material and making it easier to handle. The water generated from this gypsum reaction, referred to as "gypsum-water", is generally radioactive and the closed loop process design provides a way of containing that radioactive material.

Various modifications to the inventive process, that are within the scope of conventional engineering practice, can be incorporated into the basic system set forth. Examples include connecting the overhead gaseous space of the feed tank 34 and the recycle water tank 80 to the scrubber 44 to process any contaminants entrained in the gases present in those tank systems and to maintain those tanks at a negative pressure upon the incorporation of the blower 74. Also, any water condensed from processing the filter 70 off-gases to the stack can be recycled back to the system, preferably to the recycle water tank 80.

We claim:

1. A method of treating radioactive waste material comprising sulfur compounds, comprising:

(a) feeding an aqueous feed slurry comprising radioactive waste material comprising sulfur compounds and glass forming material into a melter, said melter comprising a molten glass pool and a plenum area above the glass pool, whereby said waste material forms solid ash and waste gas, a portion of the solid ash being incorporated into the glass pool;

(b) combusting said waste gas in the plenum area for an average residence time of at least about 3 seconds, to form an off-gas comprising sulfur compounds by contacting said waste gas with oxygen;

(c) solidifying a portion of the sulfur compounds contained within said off-gas by contacting said off-gas with an aqueous solution in a scrubber to produce sulfuric acid and scrubber off-gas and where the sulfuric acid is contacted with calcium hydroxide to form gypsum and gypsum-water; and (d) recycling a portion of the gypsum-water into the aqueous feed slurry.

2. The method of claim 1 wherein the waste material comprises ion exchange resin which comprises sulfonic groups and the off gas comprises sulfur dioxide.

3. The method of claim 2 further comprising:
(i) providing a drain pipe connected to the melter proximate to the molten glass pool; and
(ii) removing molten glass from the melter by injecting air into the drain pipe.

4. The method of claim 2, further comprising:
(i) contacting said scrubber off-gas in a mist eliminator to collect an aqueous eliminator solution and form an eliminator off-gas; and
(ii) diverting said eliminator solution to the scrubber.

5. The method of claim 4 further comprising filtering said eliminator off-gas to remove at least about 98 percent by weight of particulates above about 0.6 microns.

6. The method of claim 4 further comprising:
(i) providing a gypsum tank, positioned to receive the sulfuric acid from the scrubber, in which the sulfuric acid and calcium hydroxide are contacted, a recycle water tank connected to the gypsum tank, and a feed tank connected to the recycle water tank;
(ii) transferring a portion of the gypsum-water from the gypsum tank to the recycle water tank; and
(iii) charging waste material, glass forming material, and water from the recycle water tank, into said feed tank to form the feed slurry.

7. A process system for treating radioactive waste material comprising sulfur compounds, comprising:
(a) a feed tank, connected to a melter, for supplying a slurry of waste material, glass forming material, and aqueous fluid to the melter;
(b) a melter for vitrifying and incinerating a portion of the waste material, the melter comprising a reservoir for containing molten glass for vitrifying waste ash, a plenum area above the reservoir for combusting waste gas forming an off-gas comprising sulfur compounds, and at least one combustion intake for supplying oxygen to the plenum area;
(c) a plenum heater proximate to the plenum area for maintaining the temperature in the plenum area at about 980° C. or above;
(d) a scrubber located downstream of the plenum area for contacting the off-gas with aqueous fluid to convert the sulfur compounds into sulfuric acid;
(e) a mist eliminator, connected to the scrubber for receiving gases therefrom and for discharging liquid thereto, for contacting the scrubber off-gas with a surface to form an aqueous eliminator solution and eliminator off-gas and wherein the eliminator solution is discharged into the scrubber;
(f) a gypsum solidification tank, connected to the scrubber, for receiving the sulfuric acid and calcium hydroxide to form gypsum and gypsum-water; and
(g) a recycle tank connected to the feed tank and a recycle pipe connected from the gypsum tank to the recycle tank for recycling a portion of the gypsum-water.

8. The process system of claim 7 further comprising a drain pipe connected to the reservoir and an air lift pipe connected to the drain pipe for providing air into the drain pipe to allow molten glass material to flow out of the reservoir.

9. The process system of claim 7 further comprising a filter, connected to receive the eliminator off-gases, for filtering the eliminator off-gas to remove at least about 98 percent by weight of particulates above about 0.6 microns.

* * * * *